US010635655B2

(12) United States Patent
Naccache et al.

(10) Patent No.: US 10,635,655 B2
(45) Date of Patent: Apr. 28, 2020

(54) DEVICE, METHOD AND PROGRAM FOR SECURELY REDUCING AN AMOUNT OF RECORDS IN A DATABASE

(71) Applicant: INGENICO GROUP, Paris (FR)

(72) Inventors: David Naccache, Paris (FR); Remi Geraud, Paris (FR)

(73) Assignee: INGENICO GROUP, Paris (FR)

( * ) Notice: Subject to any disclaimer, the term of this patent is extended or adjusted under 35 U.S.C. 154(b) by 301 days.

(21) Appl. No.: 15/808,268

(22) Filed: Nov. 9, 2017

(65) Prior Publication Data

US 2018/0129700 A1     May 10, 2018

(30) Foreign Application Priority Data

Nov. 9, 2016 (EP) .................................... 16198040

(51) Int. Cl.
*G06F 16/23*     (2019.01)
*G06F 16/901*    (2019.01)
(Continued)

(52) U.S. Cl.
CPC ...... *G06F 16/2365* (2019.01); *G06F 16/9024* (2019.01); *G06Q 30/04* (2013.01);
(Continued)

(58) Field of Classification Search
CPC . G06F 16/2365; G06F 16/9024; G06Q 30/04; H04L 9/3239; H04L 9/0637; H04L 9/0643; H04L 2209/38; H04L 2209/56
(Continued)

(56) References Cited

U.S. PATENT DOCUMENTS 9,170,846 B2 * 10/2015 Delling ................... G06F 17/11
10,387,453 B1 * 8/2019 Norton ................. G06F 16/9024
(Continued)

FOREIGN PATENT DOCUMENTS

WO    WO 2008/073055 A1 *  6/2008  ............. G06F 17/30
WO    WO 2011/036663 A2 *  3/2011

OTHER PUBLICATIONS

Maesa, D. D. F., et al., "Uncovering the Bitcoin blockchain: an analysis of the full users graph", DSAA 2016, Montreal, QC, Canada, Oct. 17-19, 2016, pp. 537-546.*

(Continued)

*Primary Examiner* — Robert Stevens
(74) *Attorney, Agent, or Firm* — David D. Brush; Westman, Champlin & Koehler, P.A.

(57) ABSTRACT

It is proposed a device and method for finding nilcatenations, and proposes nilcatenation detection techniques, which can be applied to blockchains, and even constitute a proof of useful work, as the periodic removal of nilcatenations keeps a ledger size as small as possible. Banks and blockchains need to keep track of an ever-increasing list of transactions between the accounts owned by their users. However, as time goes by, many of these transactions can be safely "forgotten", in the sense that purging a set of transactions that compensate each other does not impact the network's semantic meaning i.e. the vector $B_t$ of amounts representing the balances of users at a given point in time t. Nilcatenation refers to a collection of past transaction vectors having no effect on Bt. Removing these transactions yields a smaller, but equivalent set of transactions.

11 Claims, 2 Drawing Sheets

(51) Int. Cl.
*H04L 9/32* (2006.01)
*G06Q 30/04* (2012.01)
*H04L 9/06* (2006.01)

(52) U.S. Cl.
CPC .......... *H04L 9/0637* (2013.01); *H04L 9/0643* (2013.01); *H04L 9/3239* (2013.01); *H04L 2209/38* (2013.01); *H04L 2209/56* (2013.01)

(58) Field of Classification Search
USPC ........................................................ 707/692
See application file for complete search history.

(56) References Cited

U.S. PATENT DOCUMENTS

| | | | |
|---|---|---|---|
| 2009/0327195 | A1 | 12/2009 | Iscen |
| 2012/0254597 | A1* | 10/2012 | Delling ............... G06F 17/11 712/233 |
| 2014/0143110 | A1 | 5/2014 | Qin et al. |
| 2016/0267199 | A1* | 9/2016 | Yanagisawa ........ G06F 16/9024 |
| 2017/0140382 | A1* | 5/2017 | Chari ................. G06Q 20/4016 |
| 2017/0228418 | A1* | 8/2017 | Levin ................ G06F 16/24554 |
| 2018/0032587 | A1* | 2/2018 | Abdelhamid ....... G06F 16/9024 |
| 2019/0035014 | A1* | 1/2019 | Bell ..................... H04L 9/3239 |
| 2019/0260593 | A1* | 8/2019 | Bisti .................... H04L 9/0891 |

OTHER PUBLICATIONS

Géraud, Rémi, et al., "Twisting Lattice and Graph Techniques to Compress Transactional Ledgers", SecureComm 2017, Niagara Falls, ON, Canada, Oct. 22-25, 2017, pp. 108-127.*
Ron, Dorit, et al., "Quantitative Analysis of the Full Bitcoin Transaction Graph", FC 2013, Okinawa, Japan, Apr. 1-5, 2013, 20 pages.*
European Search Report dated Apr. 7, 2017 for corresponding European Application No. EP16198040.1, filed Nov. 9, 2016, 3 pages.
J D Bruce: "The Mini-Blockchain Scheme", Jul. 31, 2014 (Jul. 31, 2014), XP055311144, 13 pages.
Benscha: "How to solve the increasing size-problem of the block chain?" Apr. 19, 2016 (Apr. 19, 2016), XP055362736, 5 pages.
Nuutila Esko et al., "On finding the strongly connected components in a directed graph", Information Processing Letters, Amsterdam, NL, vol. 49, No. 1, Jan. 14, 1994 (Jan. 14, 1994), pp. 9-14, XP002712565.
Extended European Search Report dated Apr. 13, 2017 for corresponding European Application No. EP161980401, filed Nov. 9, 2016, 4 pages.

* cited by examiner

DEVICE, METHOD AND PROGRAM FOR SECURELY REDUCING AN AMOUNT OF RECORDS IN A DATABASE

1. DOMAIN

The invention relates to blockchain management. A blockchain is a distributed database that maintains a continuously-growing list of records called blocks. These blocks are secured from tampering and revision, by using cryptography means and resources. Each block contains a timestamp and a link to a previous block. A blockchain is for example a key component of the digital currency bitcoin. It is used as the public ledger for all transactions.

2. PRIOR ART

In many database applications, chiefly those that keep track of data or value being moved around, a list of transactions is stored. A typical example is the Bitcoin blockchain, where currency is exchanged between accounts and the (complete) history of such exchanges constitutes the blockchain itself. As time passes, the number of transactions grows, and so do the storage requirements: in 2016 the Bitcoin blockchain claimed 90 GB (Gigabytes).

While not excessive in terms of storage capability by nowadays standards, the Bitcoin blockchain still exerts considerable stress on the network, in particular when the users need to access this history, even if only to search some information in it.

Even in more traditional settings, such as large financial corporations ledgers, it is customary to track transactions performed over time.

In any case, storage requirements will only grow. Indeed, a blockchain is loosely defined as a public ledger holding a history of all transactions between users. These transactions accumulate over time and constitute a large database which needs to be duplicated (to keep the ledger public) and checked (to ensure transaction validity). This causes an ever-increasing burden on all operations. For reducing the size of the distributed database, the problem consists in constructing a (provably equivalent) ledger that is shorter than the existing one. That the new and old information coincide should be easy to check, and the shorter ("purged") blockchain makes duplication and checking easier.

The problem of bookkeeping is not new, but it only becomes truly problematic in a distributed context. In the traditional setting, complete archiving is the de facto solution.

In a distributed context, using for instance blockchains, there has been some effort in trying to avoid the perpetual duplication of history, starting with Bitcoin's Merkle-based fast transaction checking. With this scheme, it is possible to verify that a transaction has been accepted by the network by downloading just the corresponding block headers and the Merkle tree. Nodes that do not maintain a full blockchain, called simplified payment verification (SPV) nodes, use Merkle paths to verify transactions without downloading full blocks.

However since SPV nodes do not have the full blockchain there must still be some other nodes that do the archiving. An idea that is often described consists in excluding the old transactions: Discarding transactions that happened prior to a pre-established time limit, while keeping only the most recent ones. The problem with this approach is that it prevents audibility, insofar as the origin of some transactions may be lost. It is also incompatible with existing protocols (such as Bitcoin), and results in an alternative ledger or cryptocurrency.

For preserving the efficient use of blockchain, there's a need for providing a technique which allows reducing the size of the distributed database while preserving the properties of security and inviolability of the reduced database.

3. SUMMARY

In the present disclosure, it is proposed a method for reducing the size of databases, by deleting the unnecessary records. The proposed technique allows reducing prior art drawbacks. More specifically, the proposed technique does not need extensive calculation. Additionally, the proposed technique allows obtaining a smaller database and dramatically reducing the transmission of information, especially in the case of distributed databases. More specifically, it is proposed a method for reducing an amount of records in a database, said method being implemented by an electronic apparatus comprising hardware resources for reducing the amount of records in databases. According to the disclosure, said database is represented in the form of an oriented multigraph in which a valuated edge from a source vertex to a destination vertex represent a record of said database, and the method comprises:

at least one step for obtaining, in said graph, at least one set of vertices and edges that form a group of a given balance for each vertex of said set, called nilcatenation set;

at least one step for removing said nilcatenation set from said oriented multigraph.

According to the disclosure, the value of said balance is equal to 0.

According to the disclosure, said step for obtaining said nilcatenation set comprises:

a step for obtaining, from said multigraph at least one subgraph comprising at least one vertex and at least one valuated edge;

at least one step for deleting, inside set subgraph, at least one vertex which is absent of a group of vertices for which the balance of the values of each vertex is null, delivering a nilcatenation subset.

According to the disclosure, said step for obtaining at least one subgraph comprises a step for determining, inside said oriented multigraph, a set of subgraphs $\{G_1, \ldots, G_l\}$, each comprising a set of strongly connected vertices.

According to the disclosure, said step for determining said set of subgraphs $\{G1, \ldots, G_l\}$ comprises implementing a Tarjan module.

According to the disclosure, said step for removing, inside said subgraph, at least one vertex, comprises, for said at least one vertex:

when the number of incoming edges or the number of outgoing edges of said vertex is equal to zero, deleting said vertex;

when the number of outgoing edges and the number of incoming edges is equal to one and the value of the single outgoing edge is different from the value of the incoming edge, deleting said vertex;

According to the disclosure, said step for obtaining, from said multigraph G, said nilcatenation set $\tilde{G}$ comprises, prior to the obtaining of said nilcatenation step:

determining, from said multigraph G, one starting record $S_R$;

from said starting record $S_R$, generating a subgraph SG; using said subgraph SG for obtaining said nilcatenation set $\tilde{G}$;

According to the disclosure, said step for generating said subgraph SG from said record $S_R$ comprises obtaining at least one node and deriving said subgraph from said at least one node.

According to the disclosure, the method comprises at least one step for determining, based on said nilcatenation set, at least one piece of data representing a reward.

According to the disclosure, that said step for determining at least one piece of data representing a reward comprises determining a transaction fee from said nilcatenation set.

The invention also relates to an electronic device for reducing an amount of records in a database, said device comprising hardware resources for reducing amount of records in databases, characterized in that said device comprises means for recording said database, in a memory, in the form of an oriented multigraph in which a valuated edge from a source vertex to a destination vertex represent a record of said database, characterized in that said device further comprises:

means for obtaining, in said graph, at least one set of vertices and edges that form a group of a given balance for each vertex of said set, called nilcatenation set;

means for removing said nilcatenation set from said oriented multigraph.

A non-transitory processor readable medium having stored thereon such a reduced database is also disclosed.

According to one implementation, the different steps of the method for reducing the size of a database as described here above are implemented by one or more software programs or software module programs comprising software instructions intended for execution by a data processor of an apparatus for reducing the size of a database, these software instructions being designed to command the execution of the different steps of the methods according to the present principles.

A computer program is also disclosed that is capable of being executed by a computer or by a data processor, this program comprising instructions to command the execution of the steps of a method for reducing the size of a database as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc.) and is capable of accessing hardware resources of this physical entity (memories, recording media, communications buses, input/output electronic boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

5. DESCRIPTION OF AN EMBODIMENT 5.1. Principles

As previously explained, one of the purpose of the proposed technique is to reduce the size of the database, which is for example used in a blockchain powered solution. The application of the proposed technique, however, is not limited to blockchain databases, but may be implemented in any database which comprises the storage of records which track the transmission of a quantity of something between entities. The use of the present techniques allows reducing the growth of storage requirements. For achieving this result, the inventors thought about how information can be efficiently stored or cleansed, i.e., represented. Such a representation should be semantically preserving, at least to the extent that the effect of no transfer (transaction) is lost in the process (Which is very different from "that no transaction is lost in the process"). In many cases, some details might become irrelevant (e.g., the precise number of successive transfer or transactions between two parties or two entities) and it is possible then to clump some events together into a more compact form.

A key part of the present technique lays on the representation of the information. The inventors made research on the way the blockchain, and more generally the successive transfers, may be represented in order to reduce the size of the representation. According to the proposed technique, the representation of the blockchain is an oriented multi graph. It is shown, herein after, that this representation is mathematically correct and that, considering this representation, it is possible to implement a size reduction method. This size reduction method delivers a reduced oriented multigraph, where the exchanges with a null balance are deleted.

Given its publicly available ledger and description, the Bitcoin network is a concrete case study of the present document. However, the technique may also be applied to institutions such as banks or the like. In the bitcoin case, every compatible client is able to connect to the network, send new transactions to it, verify transactions, and take part in the competition to create new blocks. Considering the transaction management method in a blockchain, the inventors had the intuition that an appropriate representation of the transactions could lead to apply categories of methods that have not been applied for reducing the size of the blockchain.

Figure 1:
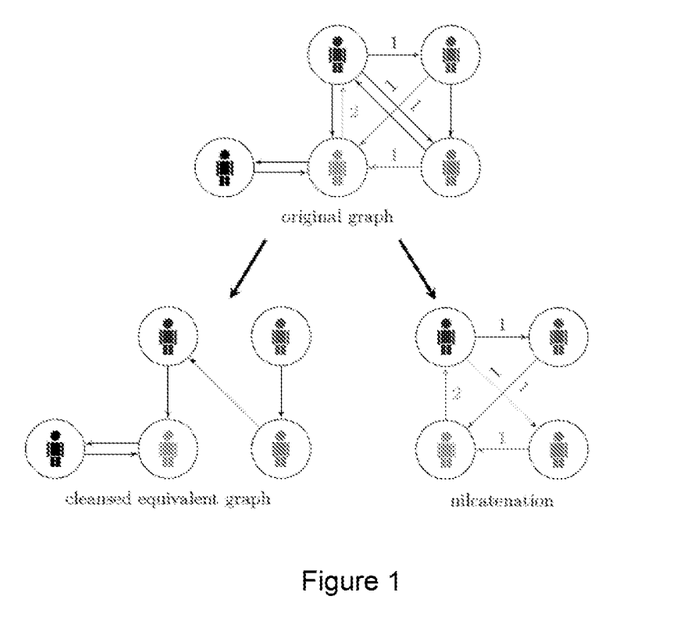
FIG. 1 illustrates the nilcatenation according to the present technique.

For simplification purpose, one considers a set of users (each one owning one account for simplicity), and transactions between these users, which can be represented as labelled edges between nodes. Thus the transaction ledger consists in a multigraph (as edges can be repeated). Our goal is to identify redundant information, in the form of a subgraph that can be removed without affecting any user's balance (the network's semantics). Such a subgraph is called a nilcatenation, according to the proposed technique. FIG. 1 exposes the principles of the nilcatenation. The blockchain "nilcatenation problem" (NCP) consists in constructing a (provably equivalent) ledger that is shorter than the existing one. That the new and old information coincide should be easy to check, and the shorter ("purged") blockchain makes duplication and checking easier.

Figure 2:
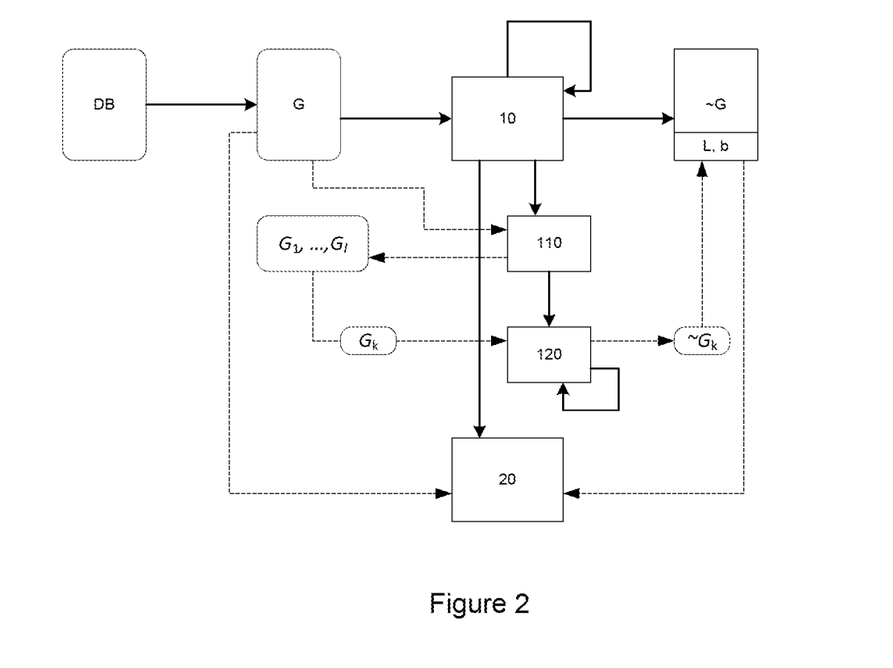
FIG. 2 is a schematic block diagram illustrating the method for reducing the size of the database.

The FIG. 2 exposes the general steps implemented in the proposed technique. More specifically, it is proposed a method for reducing an amount of records in a database (DB), the method being implemented by an electronic apparatus comprising hardware resources for reducing amount of records in databases. According to the proposed technique the database (DB) is represented in the form of an oriented multigraph (G) in which a valuated edge from a source vertex to a destination vertex represent a record of the database; according to the proposed technique the method comprises:

- at least one step for obtaining (10), in the graph (G), at least one set of vertices and edges that form a group of a given balance (b) for each vertex of the set, called nilcatenation set ($\tilde{G}$);
- at least one step for removing (20) the nilcatenation set ($\tilde{G}$) from the oriented multigraph (G).

Usually, the value of the balance (b) is equal to zero. Thus, it is then possible to identify the groups of records which cancel themselves, which are groups of records for which the balance is null between a given numbers of users (in one group). In the case of bitcoins, for example, this would be a given number of transactions between several users, forming a group, for which from the point of view of every user in the group, the balance of the values of transaction is equal to zero, which means that every user in the group has given as much than he has received. Groups may be for example cycles (loop) and/or cliques of records, these records being strongly connected with each other.

According to the present technique, obtaining the set of vertices and edges that form a group may be done is several different ways. However, a good way to realize this operation consists in grouping the records by obtaining subgraph of the multigraph.

More specifically, in at least one embodiment, the step for obtaining the nilcatenation set ($\tilde{G}$) comprises:

- a step for obtaining (110), from the multigraph (G) at least one subgraph ($G_k$) comprising at least one vertex ($v_{k1}, \ldots, v_{kn}$) and at least one valuated edge ($e_{k1}, \ldots, e_{kn}$);
- at least one step for deleting (120), inside set subgraph ($G_k$), at least one vertex ($v_{kx}$) which is absent of a group (L) of vertices for which the balance of the values of each vertex is null, delivering a nilcatenation subset ($\tilde{G}_k$).

Thanks to the implementation of this method, it become easy to reduce the graph and obtaining a simplified graph (such as the example presented in FIG. 1)

As it will be exposed herein after, solving a blockchain nilcatenation problem is a service to the community that can be rewarded by . . . coins, just as any other proof of work. In that respect the perspective of a cryptocurrency allowing users to mine by nilcatenation is completely implementable. Purging past transactions while preserving the network's semantics also has potential privacy implications. By eliminating some transactions, no lie is created about the past (i.e., create virtual transactions that do not exist) while still forgetting transactions that do not need to be remembered.

In the present, it is first proposed to formalise the blockchain nilcatenation problem and place it in the context of financial transactions representable through weighted multigraphs. The formulation and the correct proofs of this formulation form the basis of the propose technique since it is because the problem is well posed and proven that the technical solution works. More specifically, it is shown—via a reduction to the (multi-dimensional) subset-sum problem—that NCP is NP-complete.

On this basis, a method is proposed for finding the optimal nilcatenation when the underlying subset-sum problem has a low density, which in practice is almost always the case. The approach is based on a combination of graph-theoretical and lattice reduction techniques.

Since checking the validity of a solution to the NCP is easy, as a separate contribution, it is proposed to use NCP solutions as proofs of work. Reward models are presented and the practical precautions needed to correctly fine-tune the resulting incentive are also exposed.

Cheating strategies are also analysed and countermeasures are provided. The first countermeasure that is proposed suits the blockchains models considering transactions fees. A second solution is offered (together with a proof in the Random Oracle Model) for blockchain models without transaction fees.

5.2. Description of the Blockchain Nilcatenation Problem

5.2.1. Notations $[n]$ denotes the set $\{1, \ldots, n\}$. For a set S, it is denoted by $s \leftarrow_\$ S$ the action of sampling s uniformly at random. $|S|$ represents the cardinality of a set. Bold letters (e.g. $\vec{v}, \vec{A}$) are used to represent vectors and matrices.

5.2.2. Graphs and Multigraphs

The following standard definitions are used: A graph $G=(V,E)$ is the data of a finite set V and $E \subseteq V \times V$, called respectively the vertices and edges of G. A sequence of edges $(s_1, t_1), \ldots, (s_n, t_n)$ such that $t_i = s_{i+1}$ for all $1 \leq i < n$ is called a directed path from $s_1$ to $t_n$. The degree of a vertex $v \in V$ is the number of edges connected to v. The in-degree (resp. out-degree) of v is the number of edges ending at (resp. starting at) v.

The following definition can be given: If $G=(V,E)$ is a graph, then a strongly connected component (or SCC) of G is a maximal subgraph of G such that for each two distinct nodes x and y, there exists a directed path from x to y, and a directed path from y to x.

In particular, any strongly connected component is connected, but the converse does not hold.

Herein, it is considered an extension of graphs where edges can be repeated and are labeled: A labeled multigraph is denoted by $G=(V,E,\phi)$ where now $E$ is a multiset of couples from $V \times V$ (not just a set), and: $E \to \mathbb{Z}$ gives the label associated to each edge. One will use the following notation: If $e=(a,b) \in E$, and $r=\phi(e)$, and represent the edge e by writing $$a \xrightarrow{r} b.$$

The definitions of connected and strongly connected components, and the definition of degree, naturally extend to multigraphs.

5.2.3. The Subset-Sum Problem

The well-known subset-sum problem (SSP) is recalled:

Given a finite set $A \subset \mathbb{Z}$ and a target value $t \in \mathbb{Z}$, find a subset $S \subseteq A$ such that:

$$\sum_{s \in S} s = t.$$

The SSP is known to be NP-complete. An equivalent definition of the problem is given by the following:

Given a vector $A \subset \mathbb{Z}^n$, and a target value $t \in \mathbb{Z}$, find a vector $\epsilon \in \{0,1\}^n$ such that $$\langle A, \epsilon \rangle = t,$$

where $\langle \bullet, \bullet \rangle$ denotes the inner product.

The density of a particular SSP instance is defined as:

$$d = \frac{n}{m x_{a \in A} \log a}.$$

While generic SSP instances are hard to solve, low-density instances can be solved efficiently using approximation techniques or lattice reduction.

5.2.4. Formalising the NCP
5.2.4.1. A First Definition

In all that follows, the history of transactions is assumed to form a multigraph $G=(V,E,\phi)$, where the vertices $V$ correspond to entities (for example accounts of a bank or the like, but also other kind of managing entity), and a labeled edge $$a \xrightarrow{u} b$$

corresponds to a transfer from vertex a to vertex b of a quantity u (for example an amount u in bitcoins, but it may also be other kind of products or services).

The balance $b(v)$ of an individual vertex (e.g. entity) v is given by the difference between incoming transfer and outgoing transfer, i.e.:

$$b(v) = \sum_{e: \to v} \phi(e) - \sum_{f: v \to \bullet} \phi(f),$$

where $(\bullet \to v)$ denotes all incoming edges, i.e. all the elements in $E$ of the form $(w,v)$ for some $w \in V$; similarly $(v \to \bullet)$ denotes all outgoing edges. Let $b(G)$ denote the vector $\{b(v), v \in V\}$, which is the graph's semantics.

Given a multigraph $G=(V,E,\phi)$, find the maximal $\tilde{E} \subseteq E$ such that $b(G)=b(\tilde{G})$, where $\tilde{G}=(V,\tilde{E},\phi)$. $(\tilde{G}, G-\tilde{G})$ is the nilcatenation of G.

In other terms, finding a nilcatenation consists in finding edges that can be removed without impacting anyone's balance—i.e. that preserve the graph's semantics. Merging transactions together is not allowed.

5.2.4.2. NCP and SSP

A key insight in solving this problem is to realize that a similar way of stating that the edges in $\tilde{E}$ do not contribute to the balance of any v, is that they contribute a quantity of zero. In other terms, at each vertex v the balance in $\tilde{G}$ is $\tilde{b}(v)=0$. This gives the following description:

[def:ncp] Let $G=(V,E,\phi)$ be a multigraph. Write $V=\{v_1, \ldots, v_n\}$, and represent an edge e:

$$v_i \xrightarrow{r} v_j$$

as the vector $re_{ij} \in \mathbb{Z}^n$ where $e_{ij}$ is the vector of $\mathbb{Z}^n$ with 1 in position j, −1 in position i and 0 in the remaining components. Now $E$ is understood as a list of m such vectors $E=(e_1, \ldots, e_m)$. The nilcatenation problem consists in finding $\epsilon \in \{0,1\}^m$ such that $$\sum_{i=1}^{m} \epsilon_i e_i = \langle E, \epsilon \rangle = 0,$$

where the notation $\langle \bullet, \bullet \rangle$ is extended in the obvious way. The nilcatenation of G is then defined as $(G-\tilde{G},\tilde{G})$, where $\tilde{G}=(V,\tilde{E},\phi)$ and $\tilde{E}=\{e_i \in E, \epsilon_i=1\}$.

This definition makes clear the parallel between the nilcatenation problem and the multi-dimensional version of the subset-sum problem, as described in: For n=2, NCP and SSP are exactly the same problem.

In fact, more is true: NCP can be seen as a multi-dimensional variant of the subset-sum problem, where the entries belong to $\mathbb{Z}^{|V|}$ instead of $\mathbb{Z}^n$. Note however that NCP is a remarkably sparse special case of that multi-dimensional SSP.

NCP is equivalent to SSP, and hence NP-complete.

By the above discussion, a multi-dimensional SSP oracle provides a solution to any NCP instance. Vectors of $\mathbb{Z}^{|V|}$ can be described as integers using base $|V|$ encoding. Hence SSP and multi-dimensional SSP are equivalent. Therefore we have a reduction from SSP to NCP.

Conversely, assume an NCP oracle, and in particular an n=2 oracle, then by the remark made above it is exactly an SSP oracle.

5.2.4.3. Description of a First Embodiment: Solving a Generic NCP Instance

Following the previous observation, one may be tempted to leverage known SSP solving techniques to tackle the NCP. However, the reduction from NCP to SSP is not necessarily interesting from a computational standpoint for large databases: coefficients become very large, of the order of $Bb^n$, where B is the upper bound of the representation of E, and b is the chosen basis. This encoding can be somewhat improved if the bounds $B_i^{\pm}$ for each column are known, because better representations can be used.

However, in practice it may become quickly prohibitive; and even brute-forcing the original NCP may be less computationally demanding—the subset-sum problem can be solved exactly (classically) in worst-case time $\mathcal{O}(2^m)$ by brute-forcing all combinations, and even state-of-the-art algorithms only have marginally better complexity, namely $\mathcal{O}(2^{m \cdot 0.291 \cdots})$.

If one wishes to tackle the NCP directly, for n>2, the meet-in-the-middle based approaches do not apply, as in that case there is no total order on $\mathbb{Z}^n$. Instead one will leverage, according to the present technique, the LLL lattice reduction algorithm. Given as input an integer d-dimensional lattice basis whose vectors have norm less than B, LLL outputs a reduced basis in time $\mathcal{O}(d^2n(d+\log B)\log Bf)$, where f stands for the cost of d-bit multiplication.

To see why lattice reduction would solve the problem, first note that E can be represented as an n×m matrix with rational (or integer) coefficients. It is a sparse matrix, having (at most) two non-zero entries per column, i.e. (at most) 2m non-zero entries out of nm. Let $I_n$ be the n×n identity matrix and let $\varepsilon=(I_n|E)$ be the result of concatenating the two blocks: ε is an n×(n+m) matrix, having at most n+2m non-zero elements out of n(n+m).

Now if there is a solution to the NCP, then (0, . . . , 0) belongs to the lattice generated by E. In particular this is a short vector: If this is the shortest vector then LLL will find it with overwhelming probability. The question of solving the NCP from a solution to the shortest-vector problem (SVP) depends on the density, topology and weights' probabilistic distribution of the multigraph. A proof of optimality for some graph families is worked out herein after, and in the cases that optimality is not guaranteed, the result is still often close to optimal.

In practice, however, using this technique directly is impractical. The main reason is that LLL's complexity on a large graph is dominated by $m^3$, and large databases (especially large ledgers for block chaining) handle many transactions, with m being of the order of $10^8$ per day.

5.3. Description of a Second Embodiment: Faster NCP Solving

While the lattice reduction approach discussed above cannot necessarily be efficiently applied directly on a large multigraph to find a solution to the NCP, it can work on small multigraphs. According to the present technique, it is described, in this section, a pruning mechanism that reduces the problem size dramatically. This algorithm breaks down the NCP instance into many smaller NCP sub-instances, which can be tackled by LLL. Furthermore, each instance can be dealt with independently, which makes our heuristic parallelizable.

In other terms, while one could turn an NCP instance into an SSP instance and try to tackle the SSP instance with existing techniques, one first leverages the particular form of such problems—namely the graph-related properties—to reduce problem size. Reducing the problem size is possible thanks to the following two observations:

Firstly, it is only needed to consider strongly connected components. Indeed, if v,w∈V belong to two different strongly connected components of G, then by definition there is no path going from v to w and back. Therefore any amount taken from v cannot be returned, so that the balance of v cannot be conserved. Thus, all the edges of Ẽ are contained in a strongly connected component of G.

Secondly, let H be a nilcatenation of G. Then H must satisfy a "local flow conservation" property: the flow through any cut of H is zero; equivalently, the input of each vertex equates the output. Subgraphs failing to satisfy this property are dubbed obstructions and can be safely removed.

A vertex v∈V is a first-order obstruction if the following holds:

the in-degree and out-degree of v are both equal to 1;
the labels of the incoming and the outgoing edge are unequal.

One may define accordingly "zeroth-order" obstructions, where the minimum of the in- and out-degree of v is zero (but such vertices do not exist in a strongly connected component), and higher-order obstructions, where the in- or out-degree of v is larger than 1, and there is no solution to the local conservation SSP:

Let v∈V, let $E_I$ the multiset of incoming edges, and $E_O$ the multiset of outgoing edges. The local conservation SSP is the problem of finding $S_I \subseteq E_I, S_O \subseteq E_O$ such that:

$$\sum_{e \in S_I} \phi(e) = \sum_{f \in S_O} \phi(f)$$

This problem is exactly the SSP on the set $E_I \sqcup E_O$, and target value 0, hence the name.

5.3.1. Strongly Connected Components

It is easy to see that a partition of G into k strongly connected components corresponds to a partition of E into (k+1) multisets: Each strongly connected component with its edges, and a remainder of edges that do not belong to SCCs. As explained above this remainder does not belong to Ẽ.

In this embodiment, the partition of a graph into strongly connected components can be determined exactly in linear time using for instance Tarjan's algorithm, implemented in a so called Tarjan module. To each component, a descriptor is associated (for instance a binary vector defining a subset of E), and either process them in parallel or sequentially, independently. Other techniques or algorithms may also be applied, like for example the Kosaraju algorithm or the PBSC algorithm (path-based strong component).

This corresponds to reordering V so that E is a block diagonal matrix, and working on each block independently.

Figure 3:
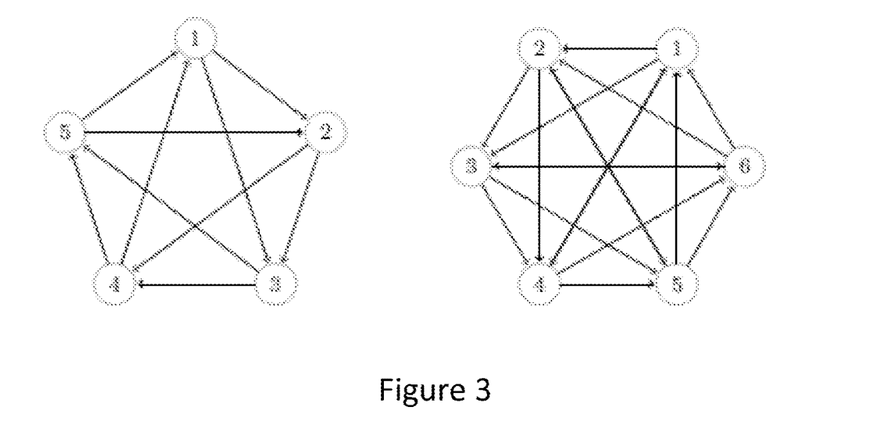
FIG. 3 discloses graphs where no first order obstruction are presented.

While first-order obstruction are easy to characterize and can be spotted in linear time, the case for higher-order obstructions is more challenging. Detecting higher-order obstructions requires solving several (small) SSP instances, which comes at an extra cost. As a reward, more edges can be removed (an example is described in FIG. 3: there are no first-order obstructions is these graphs, which are strongly connected and whose edges are all labelled identically. Such "hubs" can be detected by detecting higher-order obstructions, at the cost of solving (n+1) times an n-element SSP instance, where n=5 (left) or 6 (right).).

Repeatedly solving the SSP is probably not optimal, as there is a lot of redundant work.

Whichever method is retained, it is interesting to know whether the reward of detecting higher-order obstructions is worth the effort. This question is detailed in the next subsection. In the meantime observe that since detecting a degree n obstruction is equivalent to solving a multi-dimensional SSP instance with at most 2n elements.

5.3.2. The Pruning Algorithm

One can now present the pruning algorithm that leverages the observations of this section:

```
Data: Multigraph G = (V, E, ϕ)
Result: Multigraphs {Gi = (Vi, Ei, ϕi)}, having no simple obstruction
Function Pruning(G):
        {G1,...,G'} ← Tarjan (G)
        foreach Gk = (Vk, Ek, ϕk) do
                foreach v 2 Vk do
                        if min (d+v , d−v) = 0 then
                                remove all edges connected to v in Ei
                        else if d+v = d−v = 1 then
                                denote ein the incoming edge
                                denote eout the outgoing edge
                                if ϕk (ein) ≠ ϕk (eout) then
                                        delete ein and eout from Ek
                                end
                        end
                end
        end
        return {G1,...,G'}
end
```

This algorithm: (1) decomposes the graph into its SCCs; then (2) removes (first-order) obstructions in each component. Removing obstructions may split a strongly connected component in twice (one can keep track of this using a partition refinement data structure), so one may repeat steps (1) and (2) until convergence, i.e. until no obstruction is found or no new SCC is identified. This gives a recursive algorithm RecursivePruning.

Complexity analysis. The complexity of this algorithm depends a priori on the graph being considered, and in particular on how many SCCs one may expect, how probable it is that an obstruction creates new SCCs, how frequent obstructions are, etc. If one turn our attention to the worst-case behaviour, one can in fact consider the multigraph for which this algorithm would take the most time to run.

Tarjan's algorithm has time complexity $\mathcal{O}(n+m)$, and first-order obstruction removal has time complexity $\mathcal{O}(n)$. Thus the complete pruning's complexity is determined by the number of iterations until convergence. The worst graph would thus have one obstruction, which upon removal splits its SCC in two; each sub-SCC would have one obstruction, which upon removal splits the sub-SCC in two, etc. Assuming that this behavior is maintained all the way down, until only isolated nodes remain, one see that there cannot be more than $\log_2 n$ iterations.

Each iteration creates two NCP instances, each having n/2 vertices and around m/2 edges. Thus the complete pruning algorithm has complexity $\mathcal{O}((n+m)\log n)$. Note that in fact, each subproblem can be worked on independently.

If one now extend the pruning algorithm to also detect higher-order obstructions, say up to a fixed order d, then the obstruction removal step costs $\mathcal{O}(2^d n) = \mathcal{O}(n)$ since $2^d$ is a constant. Thus the asymptotic worst-case complexity is not impacted. However the constant term might in practice be a limiting factor, especially since higher-order obstruction may be rare. Making this a precise statement requires a model of random multigraphs. To compensate for the extra cost of detecting them, order-d obstructions should be frequent enough: One conjecture, for a general embodiment, that this is not the case, and that there is no gain in going beyond the first order.

5.3.3. Fast NCP Solving

One can now describe in full the fast NCP solving algorithm. It consists in first using the pruning technique previously described, which outputs many small NCP instances, and then solving each instance using the lattice reduction algorithm previously presented.

```
Data: Multigraph G = (V, E, ϕ)
Result: Nilcatenations {G̃i}
Function FindNilcatenations (G) :
        {G1,...,G'} ← RecursivePruning (G)
        foreach Gk = (Vk, Ek, ϕk) do
                Ẽk =LLL (I|Ek)
                G̃k = (Vk, Ẽk, ϕk)
        end
        return {G̃1,..., G̃'}
end
```

The advantage over directly using lattice reduction on the large instance, besides the obvious fact that smaller instances are dealt with faster, is that the computational burden can now be distributed, as every small instance can be treated independently.

If we are only interested in the largest connected nilcatenation, as will be the case in the following section, then our algorithm performs even better: Indeed only the largest subgraph needs to be dealt with, and one can discard the other.

5.4. NCP Solving as a Proof of Work

Many blockchain constructions rely on a proof of work, i.e. a computationally hard problem that serves to demonstrate (under some reasonable hypotheses) that one has spent a long time computing. Computing a proof of work requires operations that, as such, are useless. This waste of energy is unnecessary, and an interesting extension that is compatible with existing blockchains is proposed. The principle is to recognize as a valid proof of work the result of ledger nilcatenations. Intuitively, a larger nilcatenations would be rewarded more, as they require more work. As a result, users could keep their local copy of the blockchain smaller—indeed checking that a given nilcatenation is valid is an easy task. This is a community-serving proof of work.

Concretely, a nilcatenation block is similar to "standard" blocks, but checked in a different way. Instead of containing transactions, nilcatenation blocks contain a description of the nilcatenation. Users responsible for publishing nilcatenation blocks get rewarded as a function of the size of their nilcatenations. Users receiving nilcatenation blocks would check them and accept them only if they are valid.

Before nilcatenation blocks can be used as proof of work, however, one must consider cheating strategies and fine-tune the incentives, so that honest computation is the rational choice for miners. Two cheating strategies are identified: dubbed ghost cycles and welding, for which countermeasures are suggested. It is then discussed the question of how to reward nilcatenations.

As a summary, to use NCP as a proof of work, one should:
  require that nilcatenations obey the ghostbusting rules of, i.e. belong to a randomly-sampled subgraph of a snapshot of the transaction multigraph;
  only accept connected nilcatenations as explained in 5.4.2.;
  be rewarded linearly in the size of the nilcatenation, as described in section 5.4.2.

5.4.1. Ghost Cycles

Ghost Cycle Creation.

A first remark is that some users may create many (useless) transactions with the intent to make nilcatenation easier. For the easiness of exposition, one only considers cycles, but point out that adversaries may create cliques as well. Such an "attack" is not very practical, since users may only create transactions from the accounts they control. But since the number of accounts that a person may create is a priori unbounded, one cannot dismiss the possibility that a cheater acts as follows:

1. Find the longest path of identical transactions that point to the controlled node: write them $$v_i \xrightarrow{r} v_{i+1},$$

with i=0, ..., n and $v_{(n+1)}$ being the nodes under adversarial control. Note that r is fixed. Searching for such a cycle can be done by starting from $v_{(n+1)}$, and performing a depth-first search on the transaction graph.

2. Compute the expected gain of a nilcatenation-based proof of work that removes (n+1) transactions: call it $G_{n+1}$. Such a quantity would be publicly known, and one may assume for simplicity that $G_n > G_m$ whenever n>m.

3. If $G_{n+1} > r$, make a new transaction $$v_{n+1} \xrightarrow{r} v_0;$$

then send the nilcatenable cycle $\{v_0, \ldots, v_{n+1}\}$ as a "proof of work".

By using several accounts, artificially-long chains can be created by a user, only to be immediately "found" and removed. One dubs these "ghost cycles", and this form of cheating is of course highly undesirable.

Ghostbusting.

There are two (complementary) ways to combat ghosts. An economical approach consists in making ghosts unprofitable. A technical countermeasure, called ghostbusting and described here, ensures that ghosts cannot be leveraged, except perhaps with negligible probability.

A natural idea to fight ghost cycles could be to restrict which part of the transaction graph can be nilcatenated. It could be restricted in "time", or in "space", but straightforward approaches are not satisfactory:

For instance, if $B_t$ denotes the blockchain at a given time t, one may only consider a threshold time T, and only accept nilcatenations for $B_s$, where t-s>T. However this does not prevent an adversary from creating ghost cycles over a longer period of time.

Alternatively, observe that since the transaction that "closes the cycle" originates from the cheater, one may require that the nilcatenation doesn't contain this node. This countermeasure is easily bypassed by creating a new account whose sole purpose is to claim the rewards from the associated proof of work.

What the above remarks highlight is the need that nilcatenation be computed on a graph that is not under the adversary's control. Thus, for preventing this control from an adversary, a technique may consist in selecting a sub-graph to be processed, instead of requiring the processing of the entire multigraph. The technique then comprises:

determining, from said multigraph G, one starting record $S_R$;

from said starting record $S_R$, generating a subgraph SG;

using said subgraph SG for obtaining said nilcatenation set $\tilde{G}$;

The determining of the starting record $S_R$ may advantageously depends on several parameters such as time (t) and/or randomization. In a specific embodiment, it is possible to sample a subgraph SG uniformly in the transaction graph by using the following technique:

Ghostbusting (t,Bt):

1. Consider bt the defining block at time t
2. seed=H(bt)
3. SG=SubGraphGen(seed)
4. return SG This procedure relies on the idea that a block on the chain contains enough entropy, because it carries digests from all the preceding blocks (as per the blockchain mechanism). The principle of ghostbusting is that only nilcatenations among the nodes of SG should be accepted.

Note that the sampling procedure must be deterministic, so that verifiers can ensure that the nilcatenation indeed belongs to the authorized subgraph, and so that miners all address the same task.

Here, a pseudorandom function H is used, for which computing preimages is difficult, i.e. given y it should be hard to find x such that H(x)=y. Most standard cryptographic hash functions, such as SHA-256, are believed to satisfy this property—however one should refrain from using vanilla SHA-256 itself: Bitcoin's proof of work consists precisely in designing blocks whose hash fits a predetermined format. A simple workaround is to define for instance H(x)=SHA-256 (x||x).

The subgraph SG is obtained via SubGraphGen by selecting nodes (i.e. accounts, which may be under adversarial control, the selection being made from records), and all edges between these nodes. To be accepted, a nilcatenation should only contain nodes from this subgraph.

Assuming that the adversary has control over k out of n nodes, and that the sampled subgraph contains l nodes, with k<n/2, the probability that at least m≤l of these nodes are under adversarial control is:

$$\frac{1}{2k-n} \cdot \frac{k^m}{n^l}(k^{l+1-m} - (n-k)^{l+1-m})$$

In the limit that k«n, this probability is approximately $(k/n)^m$, which does not depend on the choice of:

It is assumed that H is a random oracle. Thus SG is sampled perfectly uniformly in G. Thus, a given node will have probability k/n to be controlled by an adversary. There are l nodes in SG, hence the probability of choosing at least m adversarial nodes is 0 if m>l and:

$$(Pr[C_{\geq m}] = Pr[C_m] + Pr[C_{m+1}] + \ldots + Pr[C_l])$$

otherwise, where $C_p$ is the event where exactly p chosen nodes are under adversarial control. Since the nodes are picked uniformly at random, $$Pr[C_p] = \left(\frac{k}{n}\right)^p \left(1 - \frac{k}{n}\right)^{l-p}$$

Therefore, $$Pr[C_{\geq m}] = Pr[C_m + \ldots + Pr[C_l]] = \sum_{p=m}^{l} \left(\frac{k}{n}\right)^p \left(1 - \frac{k}{n}\right)^{pl-p}$$

$$= \frac{1}{2k-n}\left(k\left(\left(\frac{k}{n}\right)^m \left(1 - \frac{k}{n}\right)^{l-m} + \left(\frac{k}{n}\right)^l\right) - n\left(\frac{k}{n}\right)^m \left(1 - \frac{k}{n}\right)^{l-m}\right)$$

$$= \frac{1}{2k-n} \cdot \frac{k^m}{n^l}(k^{l+1-m} - (n-k)^{l+1-m})$$

Assuming k«n, it is possible to use a series expansion in k/n of the above to get:

$$Pr[C_{\geq m}] = \left(\frac{k}{n}\right)^m \left(1 + \frac{k}{n}(m-l+1) + O\left((k/n)^2\right)\right),$$

and in particular the result follows.

Hence, the probability that an adversary succeeds in creating a large ghost cycle when the ghostbusting procedure is used gets exponentially small.

As regards how the "defining block" $b_t$ should be chosen, one only requires that all miners and verifiers agree on a deterministic procedure to decide whether $b_t$ is acceptable. One suggests the following: Let $T_{-1}$ be the time stamp of the last nilcatenation block in the blockchain, and $T_{-2}$ be the time stamp of the nilcatenation block before it. Then $b_t$ can be any block added to the blockchain between $T_{-2}$ and $T_{-1}$.

5.4.2. Welding Nilcatenations

Another interesting question, motivated by the increased number of cryptocurrency miners who parallelize their work, is to measure how much parallel computation helps in solving the NCP. As described previously, the pruning algorithm generates many small graphs that can be dealt with independently.

In this scenario, after gathering enough nilcatenations published by peers, a user could assemble them into a single, larger instance and claim the rewards for it. From a theoretical standpoint, a large, disjoint nilcatenation satisfies.

However the incentive there would be to produce quickly many small nilcatenations. Since checking for disjointedness is (quite) easy (in terms of time and resources), one suggest that users reject disconnected nilcatenations, i.e. only accept connected ones. This encourages miners to look for larger nilcatenations, and also limits the efficiency of miner pools.

Figure 4:
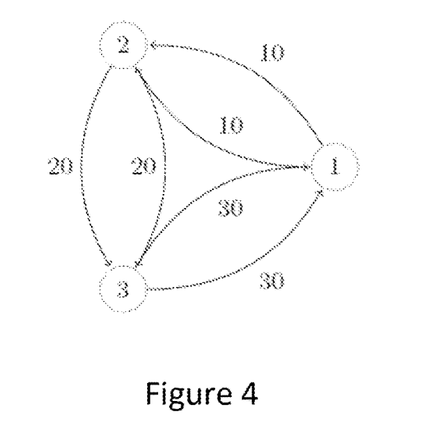
FIG. 4 discloses the concatenation of three independent nilcatenations.

Such an approach does not prevent, in theory, users from joining together partial nilcatenations into a larger one. Considering, for instance, the graph of FIG. 4, where user 1 finds a nilcatenation 10-10, user 2 finds 20-20, and user 3 finds 30-30. Then they may collude to generate a larger, connected nilcatenation.

However one conjecture that is a hard problem in general to assemble nilcatenations that are not disjoint into a larger one; or at the very least, that this is as expensive as computing them from scratch. Furthermore, the ghostbusting constraints reduce the possibilities of collusion by preventing adversarially-controlled nodes from participating in the nilcatenation graph.

5.4.3. Determining the Reward

Using the NCP as a proof of work in a blockchain situation, and for example for Bitcoin transaction management system, users may be rewarded when they computed a valid nilcatenation. The exact reward should be finely tuned to provide the correct incentives. Note that this depends on whether or not the cryptocurrency applies transaction fees.

Transaction Fees.

If such fees apply, then creating a ghost is a costly operation from an adversarial point of view. The system should set the reward for a nilcatenation with m edges, denoted reward (m), to be lower than or equal to the cost of creating a ghost of size m, which one may assume is m·c where c is the transaction fee. One may settle for reward (m)=m·c. Similar techniques may apply where a larger spectrum of transaction fees are available.

Note that using a sub-linear reward function is counter-productive, as it encourages producing many small nilcatenations, rather than a large unique one.

Conversely, using a super-linear reward function, while encouraging larger nilcatenations, also makes ghosts profitable above a certain size.

No Transaction Fees.

If there are no transaction fees, then the aforementioned method does not apply (since c=0). For cryptocurrencies that do not use transaction fees, ghostbusting( ) limits the creation of ghost cycles. In such cases, the reward function may be an arbitrary affine function in the size of the nilcatenation.

5.5. Device for Reducing the Size of the Database

The disclosure also proposes a device for reducing the size of a database. The device can be specifically designed for reducing the size of a database or any electronic device comprising non-transitory computer readable medium and at least one processor configured by computer readable instructions stored in the non-transitory computer readable medium to implement any method in the disclosure.

Figure 5:
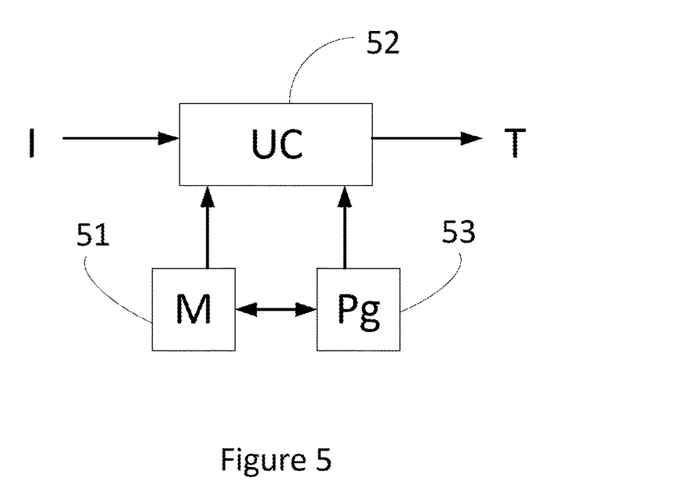
FIG. 5 discloses a simplified embodiment of a device according to the present disclosure.

According to an embodiment shown in FIG. 5, the device for reducing the size of a database includes a Central Processing Unit (CPU) 52, a Random Access Memory (RAM) 51, a Read-Only Memory (ROM) 53, a storage device which are connected via a bus in such a manner that they can carry out communication thereamong.

The CPU controls the entirety of the device by executing a program loaded in the RAM. The CPU also performs various functions by executing a program(s) (or an application(s)) loaded in the RAM.

The RAM stores various sorts of data and/or a program(s).

The ROM also stores various sorts of data and/or a program(s) (Pg).

The storage device, such as a hard disk drive, a SD card, a USB memory and so forth, also stores various sorts of data and/or a program(s).

The device performs the method for reducing the size of a database as a result of the CPU executing instructions written in a program(s) loaded in the RAM, the program(s) being read out from the ROM or the storage device and loaded in the RAM.

More specifically, the device can be a server, a computer, a pad, a smartphone or a camera.

The disclosure also relates to a computer program product comprising computer executable program code recorded on a computer readable non-transitory storage medium, the computer executable program code when executed, performing the method for reducing the size of a database. The computer program product can be recorded on a CD, a hard disk, a flash memory or any other suitable computer readable medium. It can also be downloaded from the Internet and installed in a device so as to reduce the size of a database.

The invention claimed is:

1. A method for reducing an amount of records in a database, said method being implemented by an electronic apparatus comprising hardware resources for reducing amount of records in databases, wherein the method comprises:

recording said database in a non-transitory computer-readable medium, wherein the database is represented in the form of an oriented multigraph in which a valuated edge from a source vertex to a destination vertex represent a record of said database;

at least one act of obtaining, in said graph, at least one set of vertices and edges that form a group of a given balance for each vertex of said set, called a nilcatenation set;

at least one act of removing said nilcatenation set from said oriented multigraph.

2. The method according to claim 1, wherein the value of said balance is equal to 0.

3. The method according to claim 1, said act of obtaining said nilcatenation set comprises:
   obtaining, from said multigraph at least one subgraph comprising at least one vertex and at least one valuated edge;
   at least one act of deleting, inside set subgraph, at least one vertex which is absent of a group of vertices for which the balance of the values of each vertex is null, delivering a nilcatenation subset.

4. The method according to claim 3, wherein said obtaining at least one subgraph comprises determining, inside said oriented multigraph, a set of subgraphs, each comprising a set of strongly connected vertices.

5. The method, according to claim 3, wherein determining said set of subgraphs comprises implementing a Tarjan module.

6. The method, according to claim 3, wherein act of removing, inside said subgraph, at least one vertex, comprises, for said at least one vertex:
   when the number of incoming edges or the number of outgoing edges of said vertex is equal to zero, deleting said vertex;
   when the number of outgoing edges and the number of incoming edges is equal to one and the value of the single outgoing edge is different from the value of the incoming edge, deleting said vertex.

7. The method, according to claim 1, wherein the act of obtaining, from said multigraph, said nilcatenation set comprises, prior to the obtaining of said nilcatenation act:
   determining, from said multigraph, one starting record;
   from said starting record, generating a subgraph;
   using said subgraph for obtaining said nilcatenation set.

8. The method, according to claim 7, wherein said generating said subgraph from said record comprises obtaining at least one node and deriving said subgraph from said at least one node.

9. The method, according to claim 1, comprising at least one act of determining, based on said nilcatenation set, at least one piece of data representing a reward.

10. The method, according to claim 9, wherein said determining at least one piece of data representing a reward comprises determining a transaction fee from said nilcatenation set.

11. An electronic device for reducing an amount of records in a database, the electronic device:
   a processor; and
   a non-transitory computer-readable medium comprising instructions stored thereon, which when executed by the processor configure the processor to perform acts comprising:
   recording said database, in a memory, in the form of an oriented multigraph in which a valuated edge from a source vertex to a destination vertex represent a record of said database;
   obtaining, in said graph, at least one set of vertices and edges that form a group of a given balance for each vertex of said set, called nilcatenation set;
   removing said nilcatenation set from said oriented multigraph.

* * * * *